June 14, 1949.

R. E. OLSON 2,472,984

HEAT EXCHANGE SYSTEM

Filed Dec. 14, 1946

INVENTOR.
RAYMOND E. OLSON

BY

ATTORNEY

June 14, 1949.  R. E. OLSON  2,472,984
HEAT EXCHANGE SYSTEM
Filed Dec. 14, 1946  3 Sheets-Sheet 3
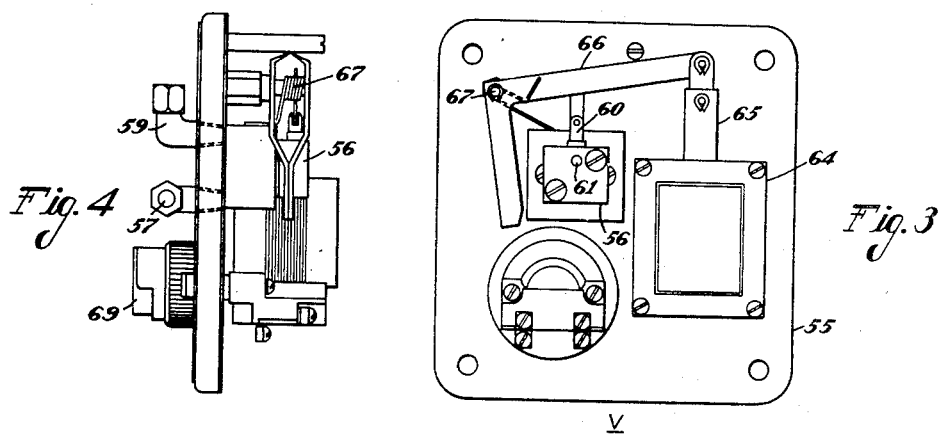
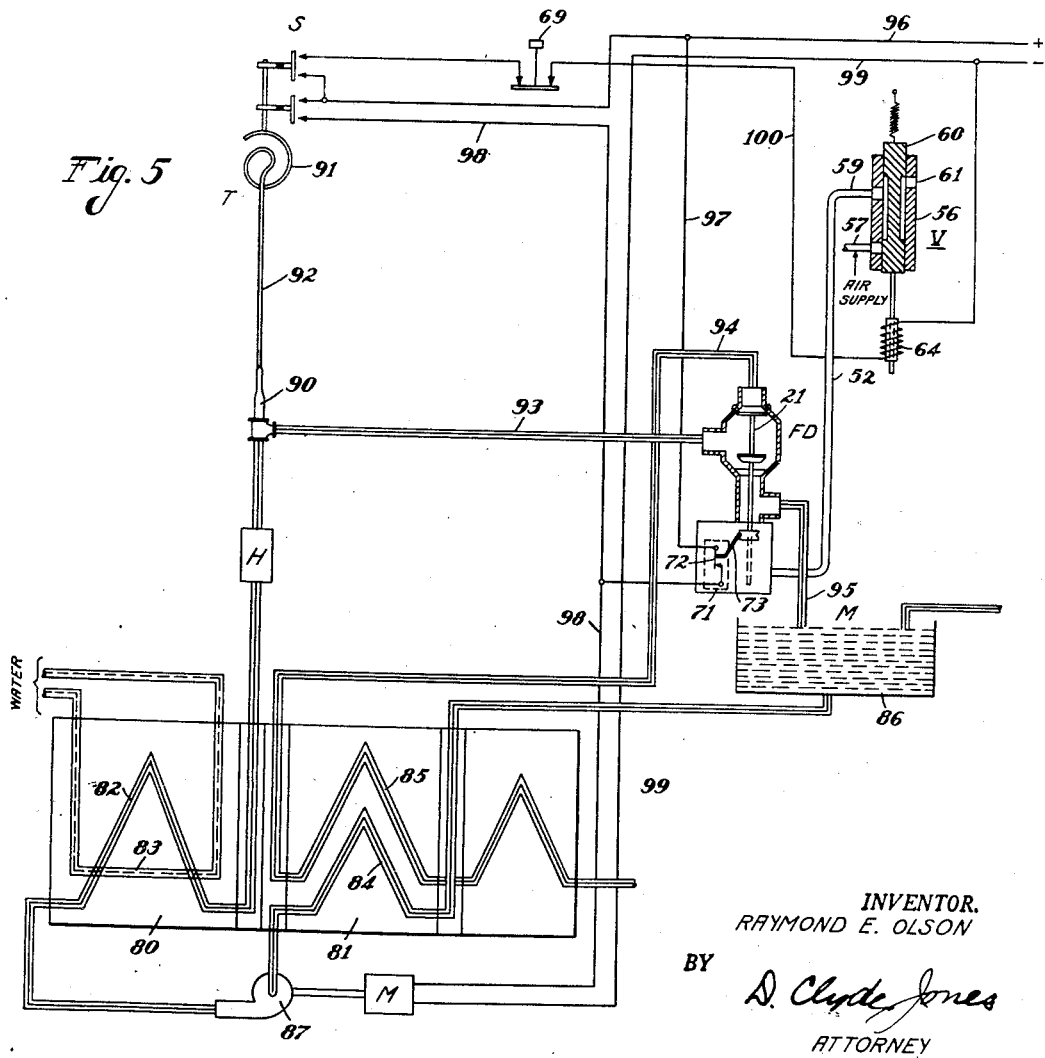
INVENTOR.
RAYMOND E. OLSON
BY
D. Clyde Jones
ATTORNEY Patented June 14, 1949

2,472,984

UNITED STATES PATENT OFFICE 2,472,984

HEAT EXCHANGE SYSTEM

Raymond E. Olson, Pittsford, N. Y., assignor to Taylor Instrument Companies, Rochester, N. Y., a corporation of New York Application December 14, 1946, Serial No. 716,222

2 Claims. (Cl. 257—2)

This invention relates to flow diversion valves together with auxiliary mechanisms and to heat exchange systems in which they are used.

In the R. E. Olson Patent No. 2,415,304, granted February 4, 1947, there is disclosed a pasteurizing system of the continuous type in which there is utilized a flow diversion valve and suitable control mechanism therefor, whereby the milk or other product to be processed, if pasteurized to the proper temperature, is caused to pass in forward flow through one path to a bottling machine or the like. On the other hand, if the milk temperature drops below the prescribed value, the flow diversion valve operates to divert the milk so that it will be reprocessed. In such systems it is highly important that every precaution be taken so that no unpasteurized milk will reach the consuming public. While pasteurizing systems of this type have reached a high degree of reliability, under rather remote unusual conditions it has been possible in the past for failures to exist in the system. For example, if a workman failed to couple the plug of the flow diversion valve to its valve stem, there might be leakage of the unpasteurized milk through the forward flow outlet in the supposedly pasteurized milk line.

In accordance with the present invention, the flow diversion valve has been made to possess such a high degree of reliability that it insures practically complete fool-proof operation.

In former flow diversion valves, the outlet port for the pasteurized milk was in a portion of the flow diversion valve so that any failure of the valve plug to be properly connected or any failure of the valve plug to operate as intended, permitted raw milk to leak into the pasteurized milk line.

In accordance with the present invention, the flow diversion valve has been so constructed that the raw or diverted milk outlet is located at the bottom of the flow diversion valve body. Thus any failure of the valve will cause all milk to pass through the raw milk outlet instead of into forward flow or pasteurized milk line.

For a clearer understanding of the invention, reference is made to the description and drawings in which:

Fig. 3 is a rear view; and

Fig. 4 is a side view of the access plate for the bonnet showing the parts mounted on the front and rear surfaces of this plate; and Fig. 5 is a diagrammatic showing of the pasteurizing system of this invention having incorporated therein, the present flow diversion valve.

Figures 1, 1A:
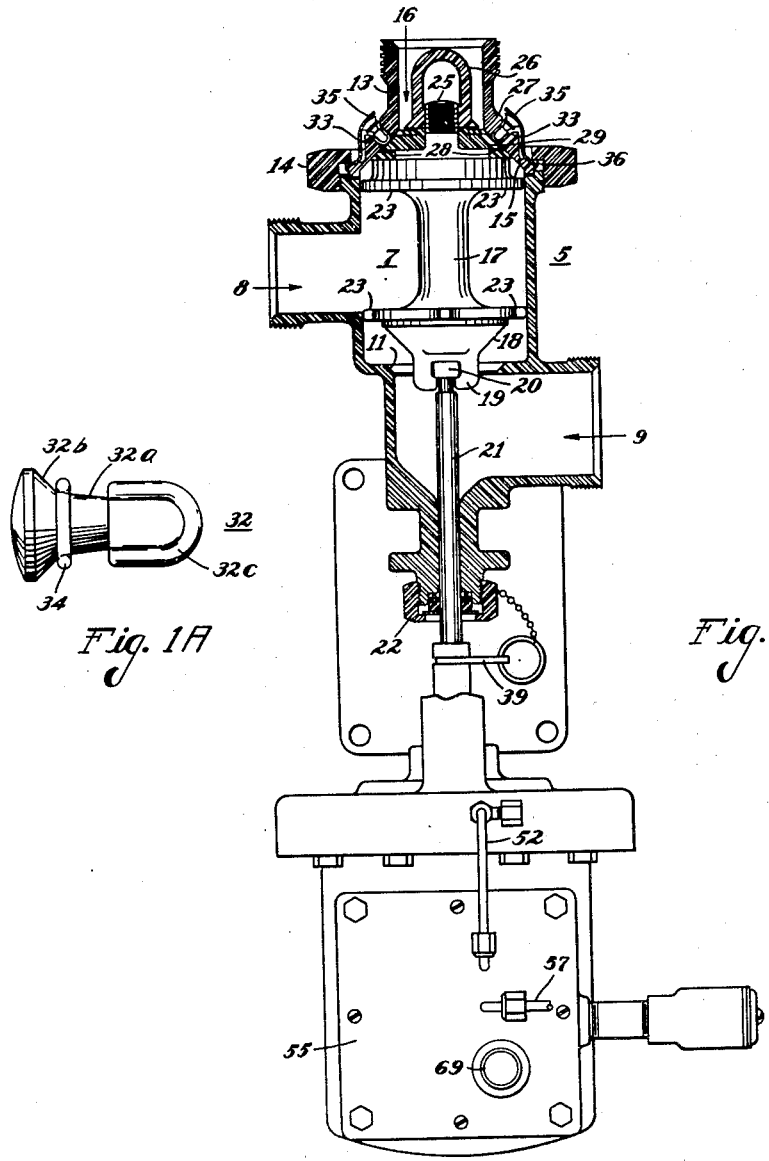
Fig. 1 is a front elevation of the flow diversion valve with a portion of the valve body broken away to disclose the internal construction thereof as well as the several parts arranged therein.
Fig. 1A is an enlarged leak detector element for use on the flow diversion valve disclosed in Fig. 1.

The flow diversion valve FD of this invention includes a body 5 intended to be mounted in a vertical position on bracket 6. The body 5 defines a valve chamber 7 which communicates with an inlet port 8 through which milk from the pasteurizer enters. The bottom end of the valve chamber, as illustrated in Fig. 1, is provided with a raw milk or diverting outlet port 9 defined by a valve seat 11. The upper part of the valve body is closed by a separable body connection 13 which is detachably secured to the body proper in sealed relation, by means of the flanged connecting nut 14. The interior of the body connection is flared to provide a conical valve seat 15 which surrounds the forward flow outlet 16 in the top of the body connection. It will be noted that the forward flow or outlet port 16 is located opposite the diversion outlet port 9 and the valve seat 11 related thereto, with the forward flow outlet port at the top of the valve body and the diverting outlet port at the bottom of this body.

The valve plug 17 is movable in the valve chamber 7 from its upper position in which it closes the forward flow port 16, to its alternate lower position in which it closes the flow diversion port 9. The valve plug comprises a reduced intermediate portion terminating at the bottom end thereof in a bevel metal valve disc 18 to engage the valve seat 11 in a metal-to-metal relation. The extreme bottom end of the valve plug is provided with a lug 19, notched to receive the head 20 on the valve stem 21 which moves the valve plug to its alternate positions. The stem passes through a suitable stuffing box 22. The valve plug is provided with upper and lower projections 23 which function to guide the plug in its up and down movement in the valve body. The upper end of the plug is made with an axially projecting, integrally threaded part 25 to be engaged by a retaining nut 26. This nut serves to secure on the plug, two spaced annular discs 27 and 28 of rubber or like resilient material, having tapered or beveled edges to conform to the contour of the upper valve seat 15. The rubber discs are separated by a metal washer 29 which is provided with a beveled surface conforming to the taper of the rubber discs. When the plug is in the position shown in Fig. 1; the beveled surface of the washer 29 encounters the stems 32a of mushroom-shaped leak detector valve elements 32 (Fig. 1A). These elements are positioned in leak detector openings 33 extending through the valve seat 15 of the body connection so that the valve discs 32b thereof, in one position, contact valve seats formed in the wall of the body connection, to close the leak detector openings therein. It will be noted (Fig. 1A) that the valve element 32 comprises the tapered valve disc portion 32b which conforms to the bevel of the valve seat at the related leak detector opening, and the tapered valve stem 32a. While these two tapers are formed at different angles they merge gradually so that a rubber doughnut-shaped sealing washer 34 will travel easily over these tapered surfaces. The washer 34 is adapted to be positioned between the valve disc and its related seat when the leak detector valve is closed. However, it can be easily moved along the valve stem for cleaning purposes. The stem 32a is provided with lugs 32c which retain the washer 34 thereon and space the stem proper from the wall of the leak detector opening. These elements are normally urged toward their closed positions by the spring fingers 35 integral with a ring suport 36. However, when the plug is in its flow diversion position to open the milk diversion outlet 9 and to close the forward flow outlet 16 for pasteurized milk, the washer 29 mounted on the upper end of the plug encounters the stems 32a of the mushroom valve elements so that the leak detector openings 33 are opened. Consequently, any unpasteurized milk that might leak past the disc 27 will escape through the leak detector openings rather than into the forward flow outlet 16 through which properly pasteurized milk is intended to pass. The ring support 36 with its spring fingers 35 for the leak detector elements 32, is preferably secured between the body connection 13 and the connecting nut 14.

It has been mentioned that the plug is movable up and down by means of the detachable stem 21. This stem is preferably locked to a second or lower stem section 38 by means of a suitable key 39. The lower section 38 which extends almost to the bottom of the bonnet 46, passes in substantial air-tight relation through the air seal unit 40 (Fig. 2) at the central opening in the top part 44 of the valve motor. This motor comprises the diaphragm 43 held in position on the part 44 by having its margin clamped thereto by means of the flange 45 on the upper edge of the bonnet 46. A perforated plate 47, mounted in spaced relation to the bottom of the bonnet, carries rollers 53 to guide the lower part of the stem section 38. A push plate 50 held by the nut 51 on the stem section 38, engages the under surface of the diaphragm 43. The plate 47 also supports the lower end of coil spring 48 which engages a spring cup 49 on the push plate 50. The push plate contacts the under surface of the diaphragm 43 and normally forces it to its upper position unless opposed by air pressure above the diaphragm 43. Thus failure of the air supply will permit the coil spring 48 to move the plug to close the forward flow outlet and to open the flow diversion outlet. It will be understood that compressed air or like motive fluid is supplied through the conduit 52 to the valve motor chamber between the diaphragm 43 and the part 44 under the control of an electropneumatic relay valve generally designated V.

Figure 2:
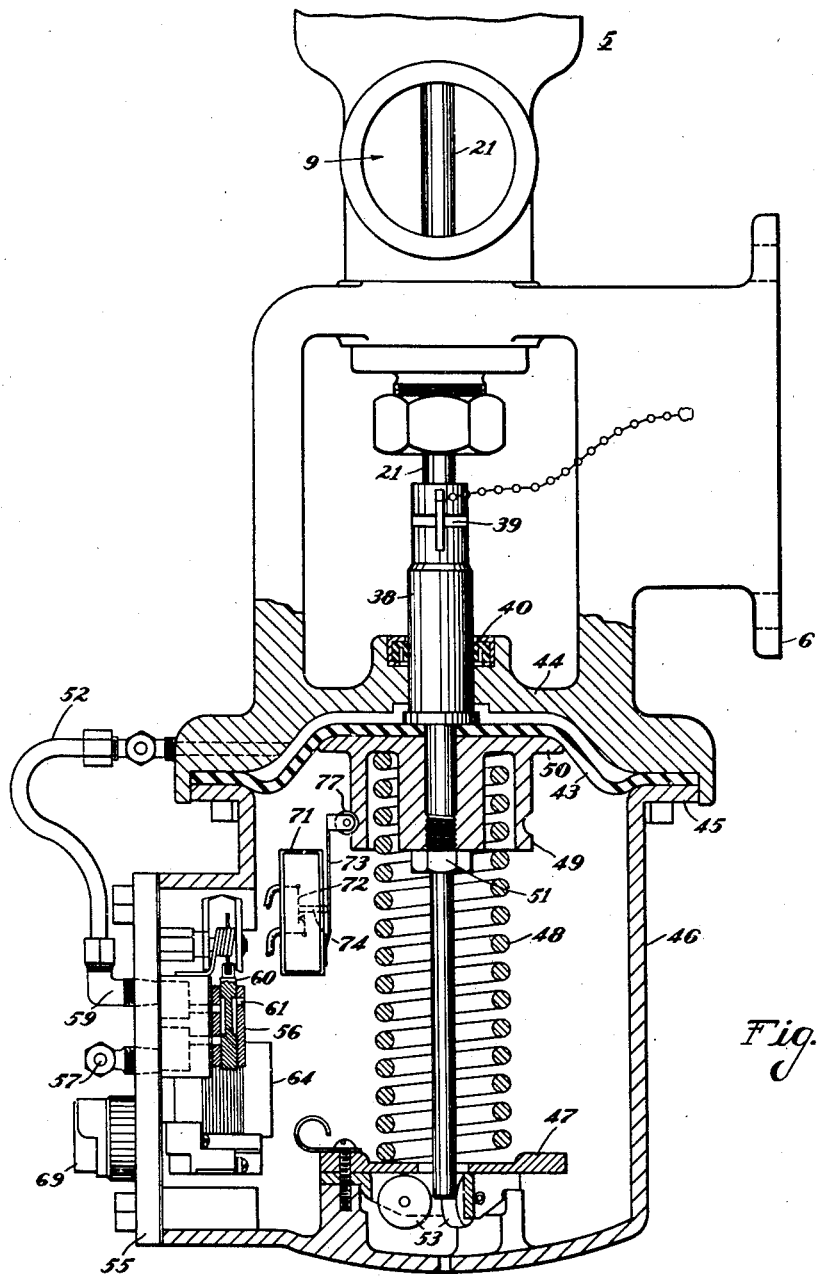
Fig. 2 is a fragmentary side elevation of the flow diversion valve, a portion of the valve body being broken away and a part of the side wall of the valve motor as well as a side of the bonnet being also broken away for clearness in disclosure.

The electropneumatic valve V is mounted on the inside of the access plate 55 which seals the open side of the bonnet of the diversion valve unit. The valve V comprises a body 56 (Figs. 2, 3 and 4) having the inlet port 57, the outlet port 59 leading to conduit 52. A movable valve element 60 in this valve is provided with an annular cut away part which, in its upper position, as shown in Fig. 2, connects the outlet port 59 with the exhaust port 61. This valve element in its lower position disconnects the exhaust port 61 from the outlet port 59 and connects this outlet port 59 to the inlet port 57, thereby connecting the compressed air supply pipe to the motor chamber above the diaphragm. This application of compressed air by the relay valve V, moves the plug of the flow diversion valve to its lower or forward flow position. The movable element 60 of relay valve V is operated by the solenoid 64. Specifically, the plunger 65 of the solenoid is pivotally connected to the free end of an arm 66 which is pivoted at 67 on the access plate. The movable element of the valve V is pivoted to an intermediate part of the arm 66. The solenoid is controlled by a safety thermal limit switch S (Fig. 5), which will be further referred to in the description of the pasteurizing system in which the present flow diversion valve is used. The access plate is also provided with a push button 69 provided with normally closed contacts for completing a break point in an electrical circuit of the system. A micro-switch 71 provided with contacts 72, is supported by a bracket (not shown) on the inner wall of the bonnet. The shell of the micro-switch carries a spring arm 73 in a position to engage the actuator 74 which actuates the contacts 72 of the switch. The free end of arm 73 is provided with a roller 77 which engages the outer surface of the spring cup 49.

The flow diversion valve FD is used in a pasteurizing system, diagrammatically illustrated in Fig. 5. This system utilizes a combined pasteurizing unit 80 and a regenerating unit 81. In the pasteurizing unit, the milk or other liquid to be pasteurized, flows through a set of coils or plates 82 in heat exchange relation to a set of heating coils or plates 83 through which there is recirculated, water maintained at a temperature slightly above the pasteurizing temperature.

The regenerator unit includes two sets of coils or plates 84 and 85 in heat exchange relation, through one set of which, such as 84, the raw milk from the tank 86 is pumped by the pump 87 to the milk coils or plates of the pasteurizer. The other set of coils or plates 85 of the regenerator, conduct the pasteurized milk from the pasteurizer in heat exchange relation to the raw milk in the set of plates or coils 84, thereby serving to cool the pasteurized milk and to partially heat the incoming raw milk. The milk discharged from the pasteurizer coils 82 passes into a suitable holding tube H, where it travels for the required fifteen-second holding interval required in so-called short time pasteurization, and then passes through pipe 93 into the inlet port 8 of flow diversion valve FD.

An electric contact thermometer T, which includes a tube system comprising the sensitive element or bulb 90 communicating with the Bourdon spring 91 through capillary 92, controls the flow diversion valve. Bulb 90 is positioned in the milk flowing to the inlet 8 of the diversion valve. The thermometer T is of such construction that when the temperature at the bulb 90 is at or above the predetermined or pasteurizing temperature, the thermosensitive medium in the tube system causes the Bourdon spring 91 of the thermometer to uncoil, thereby closing the electrical switch S for operating the solenoid 64 of the electropneumatic valve V. This valve, when operated, in turn supplies compressed air from the supply pipe 57 to the conduit 52 and thence to the motor chamber of the flow diversion valve FD for moving the valve plug to its forward flow position. With the valve thus opened, the pasteurized milk from the holding tube H, flows through the pipes 93 and 94 to the coils or plates 85 of the regenerator unit and thence to a suitable surge tank (not shown), or to a bottling machine (likewise not shown). However, when the milk at the inlet 8 to the flow diversion valve FD is below the predetermined pressure, the Bourdon spring 91 of the electric contact thermometer will coil up to open the above mentioned circuit of the solenoid 64. The valve V will be closed in this way to cut off the supply of compressed air from pipe 52 and to exhaust through port 61, the compressed air in conduit 52 and the motor top of the diversion valve FD. The restoring spring 48 of this diversion valve then operates to move its valve discs 27 and 28 so that the improperly pasteurized milk is diverted through the pipe 95 to the milk supply tank 86. From this tank, the improperly pasteurized milk flows again through the pasteurizer unit for further treatment.

In the operation of the system, the flow diversion valve FD will be in the normally diverted position (Figs. 1 and 5) when the pasteurizing system is started up each day. If the valve is properly assembled, the micro-switch 71 will be closed since the roller 77 will be engaging the groove in the outside surface of the spring cup 49 (Fig. 2) thereby permitting the actuator spring 73 to close the micro-switch contacts 72. This completes a circuit for operating the motor M which actuates the pump 87. This pump circulates the milk through the system but in this instance it flows through the diversion outlet 9 and thence through pipe 95 to tank 86. The mentioned circuit for the motor extends from one side of the current source, conductors 96 and 97, switch contacts 72, now closed, conductor 98, windings of motor M, conductor 99, to the other side of the current source. Let it be assumed that the milk is below pasteurizing temperature, the flow diversion valve will, therefore, remain in its diverted position until the correct temperature is reached. At that time the safety thermal-limit switch S, including the thermometer T, energizes the solenoid 64 of valve V which admits air to the motor diaphragm chamber of the flow diversion valve to move the plug 17 of this valve downward into the forward flow position. The circuit for the solenoid is traceable from one side of the current source, conductor 96, through the upper pair of contacts at switch S, normally closed push button switch 69, conductor 109, winding of solenoid 64, conductor 99 to the other side of the current source. As soon as the valve plug 17 begins to travel, the micro-switch 71 opens, thereby opening the circuit of motor M to stop the milk pump 87. However, the milk pump 87 will be energized by the safety thermal-limit switch S at the same time that the solenoid is energized and, therefore, the pump continues to operate. The last mentioned operating circuit for the motor M is completed from one side of the current source, conductor 96, through the lower pair of contacts at switch S, conductor 98, windings of the motor M, conductor 99 to the other side of the current source. When the temperature of the milk drops below the correct value, the safety thermal-limit switch opens the operating circuit causing the motor M to stop. The switch S also opens the operating circuit of the solenoid 64 which, in turn, cuts off the air supply to the diaphragm motor of the flow diversion valve and permits the compressed air in the diaphragm motor to exhaust through port 61. As a result of the operation of valve V by the solenoid, and as soon as the air exhausts from the diaphragm motor, the restoring spring 48 raises the valve plug upward to its diverted flow position. As soon as the correct diverted position of valve plug 17 is reached, the roller 77 of the micro-switch 71 will rest in the groove in the spring cup 49, indicating that the valve plug is in its fully diverted position. Under this condition, the contacts 72 of the micro-switch will be closed. This completes a circuit, above-described, which energizes the milk pump to recirculate the milk back through the pasteurizer. It is to be noted that the milk pump will remain shut-off unless the plug 17 of the flow diversion valve moves to its fully diverted position since otherwise roller 77 will not rest in the groove in the spring cup 49 and the micro-switch contacts 72 will not be closed to complete the milk-pump circuit. In other words, if the valve disc 18 of plug 17 does not engage the valve seat 11 due to a piece of foreign matter thereon, the roller 77 will ride on the part of the cup 49 below the groove or if the plug 17 is improperly assembled as evidenced by the fact that valve stem 21 is not connected by stem section 38 by key 39, section 38 will tend to drop so that roller 77 will now ride on the part of the cup above the groove therein. This insures that there will be no leakage of raw milk into pasteurized milk pipe 94.

It should be pointed out that the diversion port 9 is larger than the input port 8 or the forward flow port 16. Also, the port 9 is located at a lower level than either of the other ports just mentioned. Consequently, there is a negligible pressure drop through the valve when the plug 17 is in the diverted flow position, that is, the pressure of sublegal milk is always less than the pressure of the pasteurized milk. Thus, the present arrangement insures that there will be no forward flow of milk if the plug 17 does not engage the valve seat 15 correctly or if the plug 17 is omitted entirely.

In the present arrangement, provision is made for effecting hot sterilization, that is the pumping of boiling cleansing liquid through the various milk passages of the pasteurizing unit. While such hot sterilization is taking place the boiling cleansing liquid can be pumped from tank 86 through pipe 84, pump 87, pipe 82, holding tube H and through pipe 93 to the inlet port of the flow diversion valve. Since the cleansing liquid is above the pasteurizing temperature, the thermometer T including the bulb 90, will close contacts of the switch S. The closing of these switch contacts causes the flow diversion valve FD to open its forward flow port and to close its diversion port as in the case of properly pasteurized milk. However, it is also desirable to cause the cleansing liquid to flow through the diversion port of the flow diversion valve and also through the pipe 95. In order to effect this action, it is necessary to deenergize the solenoid 64 so that its valve V will be moved to the position shown in Fig. 5, with the result that the flow diversion valve will open its diversion port as shown. In accordance with the present invention, the push button switch 69, can be opened to interrupt the energizing circuit of the solenoid 64 even when the safety thermal switch S is closed. Thus the flow diversion valve can be positioned to divert the sterilizing liquid through pipe 95. In this diverted position of valve FD, the contacts 72 of the micro switch will be closed to complete a circuit for the pump motor M. The pump 87 circulates the liquid as in the case of diverted milk. It will be noted that a multiple operating circuit, independent of the micro switch contacts 72, is also completed at this time for the pump motor M. This multiple circuit extends from one side of the current source, conductor 96, through the lower set of contacts of switch S, conductor 98, winding of the motor, and conductor 99, to the other side of the current source.

I claim:

1. In a flow diversion valve, a valve body defining a valve chamber, said body being provided with an inlet port in the side thereof, with a forward flow port in the top thereof, and with a diversion port in the bottom thereof, a plug provided at its ends with closure members respectively closing said forward flow port and said diversion port in the alternate positions of the plug, a valve stem connected to the lower end of said plug, a restoring spring normally biasing said stem to move said plug and its closure members into a position to open said diversion port and to close said forward flow port, a pneumatic motor comprising a top part and a diaphragm having its margin sealed to said top part to form a chamber, a pipe for pressure fluid communicating with said chamber, a push plate engaging the under side of said diaphragm, a stem extension connected to the lower end of said valve stem, said stem extension being mounted to move in substantially airtight relation through said top part and to pass in substantially airtight relation through said diaphragm into connection with said push plate, said push plate being provided with a spring cup axially alined with said stem extension, said restoring spring having its lower end restrained and having its upper end retained by said spring cup, said cup having a recess in the surface thereof, and a switch having contacts and an actuator movable alternately by the wall of said recess and by the surface of the cup proper for reversing the position of said contacts.

2. In a pasteurizing system for a liquid such as milk or the like, a heat exchange unit, means including a flow diversion valve for said liquid communicating with the outlet of said unit, said valve being provided with a forward flow port and with a diversion port, a plug provided at its ends with closure members respectively closing said forward flow port and said diversion port in the alternate positions of the plug, a valve stem connected to the lower end of said plug, a restoring spring normally biasing said stem to move said plug and its closure members into a position to open said diversion port and to close said forward flow port, a pneumatic motor comprising a top part and a diaphragm having its margin sealed to said top part to form a chamber, a pipe for pressure fluid communicating with said chamber, means including a solenoid valve for controlling the flow of pressure fluid through said pipe, a thermal switch responsive to a given temperature of said liquid, a circuit for said solenoid valve including normally closed contacts of a manual switch as well as contacts of said thermal switch, a push plate engaging the under side of said diaphragm, a stem extension connected to the lower end of said valve stem, said stem extension being mounted to move in substantially airtight relation through said top part and to pass in substantially airtight relation through said diaphragm into connection with said push plate, said push plate being provided with a spring cup axially alined with said stem extension, said restoring spring having its lower end restrained and having its upper end retained by said spring cup, said cup having a recess in the surface thereof, a valve operated switch having contacts and an actuator movable alternately by the wall of said recess and by the surface of the cup proper for reversing the position of said contacts, said groove and actuator being so related that the switch contacts are moved to their alternate position at the closing of said forward flow port, a pump for advancing said liquid through said unit and through one or the other of said ports, a motor for driving said pump, a circuit for operating said motor including closed contacts of said thermally operated switch, and another circuit for said motor completed through contacts of said valve-operated switch.

RAYMOND E. OLSON.

REFERENCES CITED

The following references are of record in the file of this patent:

UNITED STATES PATENTS

| Number | Name | Date |
|---|---|---|
| 1,327,675 | Hornung | Jan. 13, 1920 |
| 2,302,469 | Patterson | Nov. 17, 1942 |
| 2,392,021 | Wildermuth | Jan. 1, 1946 |